Figure 1:
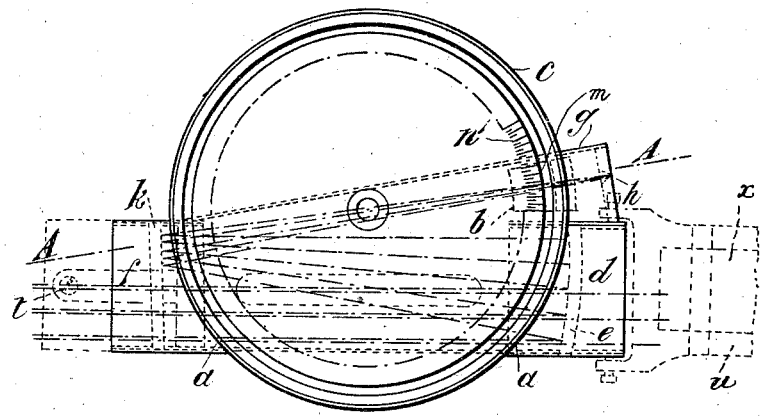

No. 752,667. PATENTED FEB. 23, 1904.
H. GRUBB.
GEODETICAL INSTRUMENT.
APPLICATION FILED SEPT. 21, 1901.
NO MODEL. 3 SHEETS—SHEET 1.

Witnesses:

Inventor:
Howard Grubb

No. 752,667. PATENTED FEB. 23, 1904.
H. GRUBB.
GEODETICAL INSTRUMENT.
APPLICATION FILED SEPT. 21, 1901.
NO MODEL. 3 SHEETS—SHEET 2.
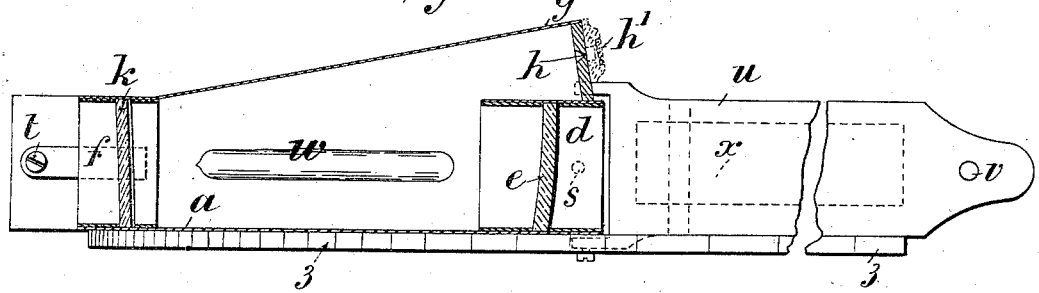
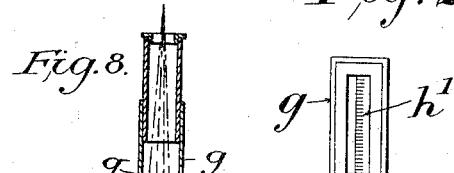
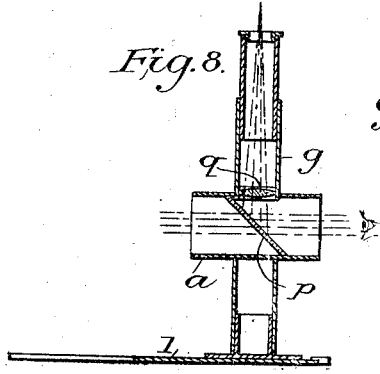
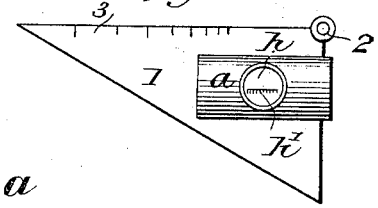
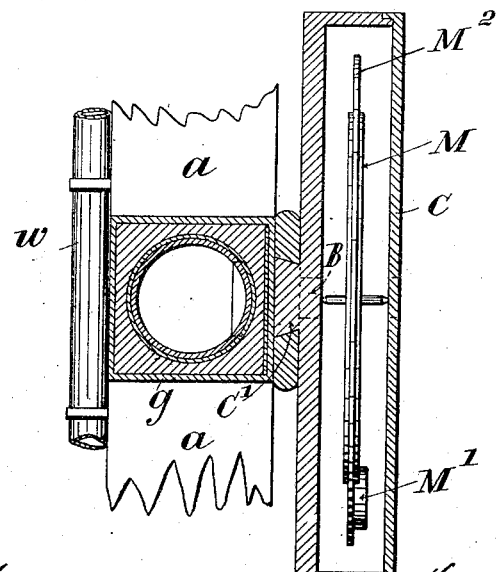

No. 752,667. PATENTED FEB. 23, 1904.
H. GRUBB.
GEODETICAL INSTRUMENT.
APPLICATION FILED SEPT. 21, 1901.
NO MODEL. 3 SHEETS—SHEET 3.
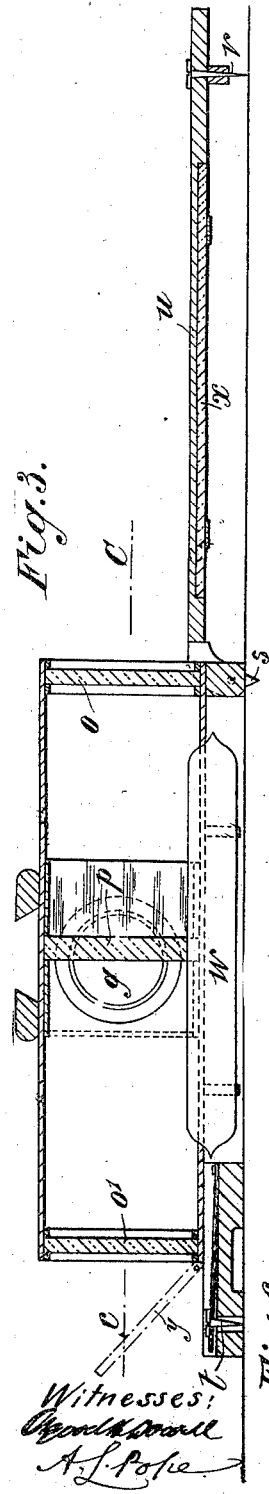
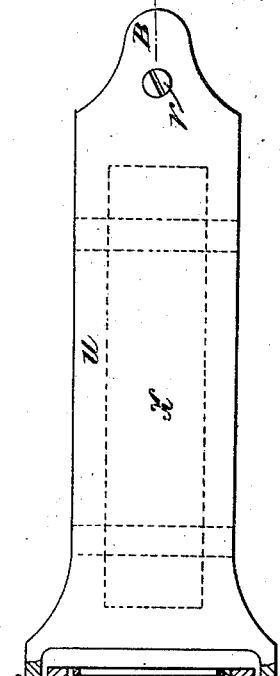
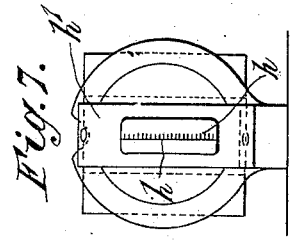
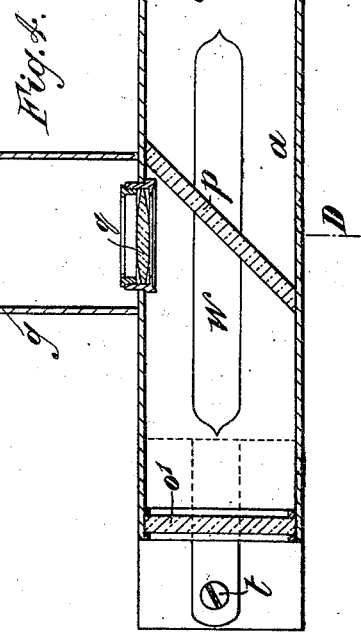
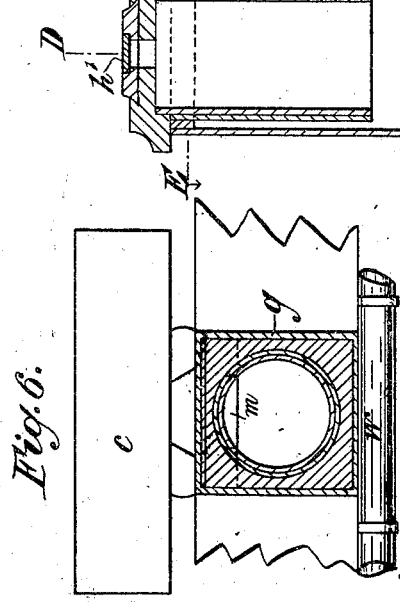
Witnesses:
Inventor:
Howard Grubb No. 752,667. Patented February 23, 1904.

UNITED STATES PATENT OFFICE.

HOWARD GRUBB, OF DUBLIN, IRELAND.

GEODETICAL INSTRUMENT.

SPECIFICATION forming part of Letters Patent No. 752,667, dated February 23, 1904.

Application filed September 21, 1901. Serial No. 76,115. (No model.)

*To all whom it may concern:*

Be it known that I, HOWARD GRUBB, a subject of the King of Great Britain and Ireland, residing at Dublin, Ireland, have invented Improvements in Geodetical Instruments, of which the following is a specification.

In the specification of Letters Patent granted to me dated September 24, 1901, No. 683,203, there are described sighting devices for guns so constructed that a distant object to be sighted and an image of an object carried by the sighting device and constituting the sight proper can be superposed or caused to coincide in such a way that they can be seen simultaneously and that the sight shall appear to be approximately as far distant as the object being sighted, so that it can be viewed under practically the same optical conditions as the object, the result being that the sighting of the distant object can be effected with greater ease, comfort, and accuracy than is possible with any of the ordinary arrangements of naked-eye sights, in using which it is impossible to focus the eye simultaneously on the fore sight and the object and in which also there is a large parallax, which necessitates the use of a back sight to help the observer to preserve the necessary fixity of position of the eye during observation. For producing an image of the sight such as referred to there are used, in conjunction with a sight formed, for example, by the image of a line, cross, or other device formed by one or more slits or transparent lines in or on an opaque diaphragm, means whereby the luminous rays proceeding therefrom to the eye of an observer are rendered either by refraction or by reflection parallel to one another and a reflecting-surface from which an image of the sight can be reflected and caused to enter the eye of the observer simultaneously with a view of a distant object. The reflecting-surface may be that of plain glass; but in order to increase the brilliancy and clearness of the image of the sight reflected therefrom it is preferred to use a transparent body, coated with a film of a reflecting medium, such as sulfid of lead or metallic silver, that will increase the reflecting power of the reflecting-surface of the transparent body, while allowing of the passage of rays of light therethrough.

Now the present invention has reference to the construction, with sighting devices and transparent reflecting-films of the kind referred to, of geodetical instruments of various kinds—such, for example, as prismatic compasses, inclinometers, graphometers, and levels—whereby without appreciable additional cost instruments such as referred to are produced which offer facilities for obtaining more accurate results than have been usual with instruments as heretofore used, besides also facilitating the employment of such instruments by persons not specially skilled in their use.

The invention consists in various novel features of construction and combinations and arrangements of parts, all as hereinafter described and afterward more particularly pointed out in the claims.

Figure 2:
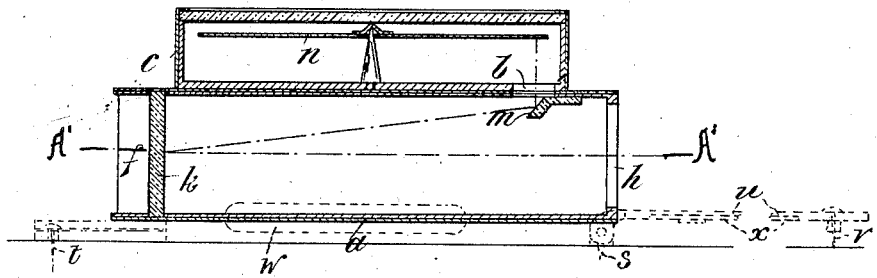
Figure 5:
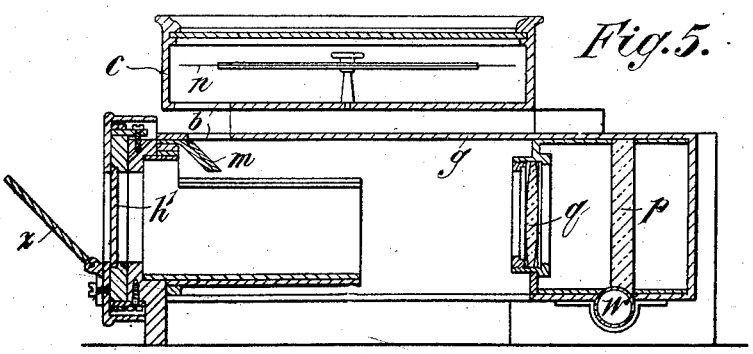

In the accompanying drawings, Figure 1 is a plan, and Fig. 2 a section on the line A A of Fig. 1, showing one construction of geodetical instruments according to this invention. Fig. 2ª is a horizontal section on the line A' A' of Fig. 2. Fig. 2ᵇ is a view of a diaphragm with modified sight for use in the instrument shown in Figs. 1, 2, and 2ª. Figs. 3 to 7, inclusive, show a geodetical instrument according to this invention suitable for use at will either as a prismatic compass or as an inclinometer, or as a graphometer or plane table, or as a level, Fig. 3 being a section on the line B B of Fig. 4; Fig. 4, a sectional plan on the line C C of Fig. 3; Figs. 5 and 6, vertical sections on the line D D and E E, respectively, of Fig. 4; and Fig. 7, a view of the outer end of the collimator-tube. Fig. 6ª is a similar view to Fig. 6 showing the instrument adapted for use as an inclinometer. Fig. 8 is a vertical section, and Fig. 9 a plan showing a modified form of apparatus adapted for use as a graphometer.

In the construction of prismatic compass shown in Figs. 1 and 2 the sighting device *a*, upon the top of which and over a hole *b* therein the compass-card box *c* is fixed, is of the reflecting type. It comprises a tube that is provided at its forward end with a comparatively large opening $d$, closed by a piece of transparent glass $e$, that has a concave inner surface coated with a transparent reflecting-film of the kind hereinbefore referred to and through which a distant object can be seen by an observer looking through the rear end of the tube, which is provided with an eyepiece or opening $f$ for the purpose. At the side of the front opening $d$ is a narrow compartment $g$, the front end of which is of opaque material, formed with a very narrow or thin vertical slit $h$ to constitute a sight through which luminous rays can pass in a backward direction through the open rear end of the compartment $g$ and fall upon a reflecting-surface $k$, so inclined or arranged at the back of the tube, as shown, as to reflect them in a forward direction and cause them to fall upon the concave reflecting-surface of the piece of glass $e$ at the front of the tube $a$, from which surface the luminous rays forming an image of the line or sight are reflected in a backward direction and parallel to one another to the rear eyepiece or opening $f$. The reflecting-surface $k$ may be formed by a reflecting-film of chemically-deposited silver upon a piece of parallel glass, through which the image of the sight and the distant object can be seen. Behind the slit $h$ may be an opaque diaphragm—for example, of glass, coated with silver, paint, or the like—through which is cut a thin vertical line to constitute the sight, as in the construction of instrument shown in Figs. 3 to 7, inclusive, and hereinafter described. Such a diaphragm is shown in dotted lines at $h'$ in Fig. $2^a$. If, however, the slit $h$ be made very thin and straight, the additional diaphragm can in some cases be dispensed with.

Below the hole $b$ in the bottom of the compass-card box $c$ and the top of the sighting-tube $a$ is an inclined reflecting plane surface $m$, formed, for example, by an inclined mirror, as shown, or by the silvered inclined surface of a right-angled prism so arranged that an image of the particular division of the circular row of angular divisions $n'$ on the compass-card $n$, which gives the bearing of the object being observed, will be reflected backward through the rear eyepiece or opening $f$, the ghost or image of the vertical line of sight $h$, which serves for sighting the object, also serving as a nonius or index for reading the said division on the compass-card.

In the example the inclined reflecting-surface $m$ blocks out a small portion of the upper part of the vertical line constituting the sight $h$, but allows a portion of the compass-card $n$ to be seen instead, and as the compass-card is arranged at about the same distance above the reflecting-surface $m$ as the vertical slit $h$ is behind it and both are at a distance from the concave mirror equal to its focal length the luminous rays entering the eye of an observer from both the divisions on the compass-card and from the vertical slit are perfectly parallel. Consequently there is no parallax between them or between either of them and the distant object whose bearing it is desired to obtain.

The compass-card box $c$ is removably attached to the upper side of the sighting-tube $a$, as by a dovetailed-shaped projection $c'$ on the one engaging a correspondingly-shaped groove or recess $c^2$ in the other, so that the compass-card box can be readily removed and replaced by a box containing a clinometer and made like the compass-box, with an opening in its bottom corresponding to the opening $b$ in the sighting device. By then turning the instrument sidewise through an angle of ninety degrees it can be used as an inclinometer for obtaining the bearings of objects in a vertical plane, the mode of using the instrument being the same as with the prismatic compass; but the image of the sight instead of being a vertical line will then be a horizontal one.

Fig. $6^a$ shows the instrument provided with an inclinometer and arranged for measuring vertical angles. The inclinometer is similar to the compass, except that the graduated compass-card $m$ and magnetic needle used in that instrument are replaced by a pivoted ring, disk, or carrier M, which is weighted at its lower side, as by a weight M', and is provided with a graduated transparent or opaque scale of degrees on an opaque or transparent annular strip $M^2$, the arrangement being such that when in use the weighted ring, wheel, or carrier M, with strip $M^2$, will be held stationary by gravity, while the box C, in which the said parts are pivoted, is partly rotated with the sighting device to which it is attached, the rear wall of the box having an opening B therethrough opposite the strip $M^2$ and also a dovetailed-shaped projection C', by which it can be detachably connected to the sighting-tube $a$.

In the instrument shown in Figs. 3 to 7, inclusive, the sighting device is shown as of the refracting type, the sighting-tube $a$ being closed at the front and rear ends with pieces $o$ and $o'$, respectively, of plane glass and provided at an intermediate part with a piece $p$ of parallel glass arranged at an angle of forty-five degrees to the longitudinal axis of the tube, one of the surfaces of the piece of parallel glass being provided with a reflecting-film of the kind hereinbefore referred to. The collimator-tube $g$ is arranged at right angles to the sighting-tube $a$ and is provided at its outer end with a diaphragm $h'$, carrying the sight $h$, and at its inner end with an achromatic lens or object-glass $q$, whereby the luminous rays proceeding from the sight $h$ are rendered parallel before impinging upon the inclined reflecting-surface of the piece $p$ of parallel glass. The diaphragm $h'$ may be made removable, so that either a diaphragm bearing a sight $h$ in the form of a single fine line or a diaphragm bearing a sight in the form of a scale, as in Fig. 7, may be used, as desired. The top of the collimator-tube $g$ is adapted to carry the removable box $e$ of the prismatic compass or the inclinometer and is provided with the hole $b$ and inclined mirror $m$, by which an image of the divisions on the portion of the card $n$ of the compass or inclinometer just above the hole will be reflected onto the inclined piece $p$ of parallel glass simultaneously with the image of the sight $h$ and viewed while sighting the object whose position is to be noted.

The under side of the sighting device is provided at the front end with a needle-point $s$ to serve as a pivot and at the rear end with a spring needle-point $t$, and to the front end of the said device is pivoted an arm $u$, provided with a needle-point $v$. The three needle-points $s\ t\ v$ and the vertical image of the line representing the sight $h$ are arranged to come in the same vertical plane.

To the under side of the instrument is fixed a water or spirit level $w$, and to enable the air-bubble thereof to be viewed simultaneously with the sighting of a surveyor's staff at a distance the radius arm $u$ is provided with a mirror $x$, in which when the arm is folded under the instrument an image of the air-bubble can be viewed while sighting the surveyor's staff.

The compound instrument can be used in the manner hereinbefore described as a prismatic compass or as an inclinometer, a compass-card box or an inclinometer-box being attached to the top of the sighting device, as required, and a diaphragm $h'$ used bearing a sight in the form of a fine straight line. At this time the pivoted arm $u$ is folded under the sighting-tube $a$.

When the instrument is to be used as a graphometer, it is pivoted by means of its needle-point $s$ to a table or board above a sheet of paper upon which a survey is to be made. The instrument can then be moved about its pivot $s$, so as to bring the image of the sight $h$ on a distant object, such as a staff, held at different parts of the ground to be surveyed and each corresponding position of the instrument indicating the bearing of the object at each position can be noted on the paper by depressing the spring needle-points $t$ and $v$. By this arrangement much greater accuracy can be obtained than with the sighting device—viz., a slit and cross-threads heretofore employed in graphometers.

A survey can be made with this instrument by mounting it to turn on a drawing-board at one observation-station and pricking off on the paper the bearings of the various points to be noted, as indicated by a staff or otherwise, and then moving the whole instrument to a second station from which the bearings of the same points are again taken, the distance between the two stations being chained and laid down to scale on the drawing-paper. This method is capable of giving considerable accuracy. Or all the bearings can be marked off at one station, the distances at the various points from the station being determined by a suitable range-finder. It is, however, preferred for this purpose to provide the sighting device with a sight in the form of a calibrated scale $h$, (see Fig. 7,) so that the distances of the various points can be at once estimated by noting the apparent size of an object of known height with the aid of the image of the scale which is thrown on the object, the distance being recorded on the paper adjacent to the bearings of the corresponding points. This method can be carried out very rapidly and is suitable where great accuracy is not required and time is limited. With distances of not more than two hundred feet the error need not exceed three per cent. when working with the unaided eye or one per cent. when working with the aid of a low-power field-glass.

When the instrument is to be used as a level, the arm $u$ is folded underneath the tube $a$, the compass or inclinometer removed, and the instrument turned upside down and either held in the hand for rough estimation or attached to parallel plates on a tripod-stand, as in an ordinary geodetical level, the diaphragm $h'$, with scale-sight $h$, Fig. 7, being replaced by a diaphragm bearing a sight in the form of a simple horizontal line or a cross.

The rear end of the sighting-tube $a$ may be provided with a pivoted mirror $y$, (see Fig. 3,) by means of which the distant object and image of the sight can be seen by looking down on the instrument instead of through it. Also the outer end of the collimator-tube $g$ may be provided with a mirror $z$ (see Fig. 5) to illuminate the sight $h'$.

If desired, a combined instrument for use as a prismatic compass, inclinometer, graphometer, and level may be constructed with a sighting device of the reflecting type shown in Figs. 1 and 2. For this purpose the sighting device shown in Figs. 1 and 2 may be provided with a pivot $s$, radius-arm $u$, needle-points $t$ and $v$, and level $w$, as indicated in dotted lines. Such sighting devices may also be provided with a diaphragm bearing a sight in the form of a scale, as shown in Fig. $2^b$.

In the modified construction shown in Figs. 8 and 9 the sighting-tube $a$ and collimating-tube $g$ are arranged one above the other, with their axes at right angles to one another, and are carried by a base 1, that may conveniently be of triangular shape, as shown, and is adapted to be pivoted, as by a perforated lug 2 at one corner and a pin, to a drawing-board above a sheet of drawing-paper. The diaphragm $h'$ is formed with a sight $h$ in the form of a scale, each division of which is equal, say, to the one five-hundredth part of the focus of the collimating-lens or object-glass $q$, and along one side of the triangular base 1 is a scale 3, with numbers corresponding to the numbers that are seen on the sight-scale. For surveying a field or other area the instrument is pivoted by its lug 2 above a sheet of drawing-paper and to a drawing-board supported on a tripod-stand arranged at the central portion of the said field or other area, and an assistant, carrying a staff on which a length of, say, two yards is distinctly marked, is sent out with instructions to stop at every corner or wherever the boundary alters its direction and hold the staff vertical at each of such points. The staff is then sighted at each of such points and brought into the line of collimation by turning the whole instrument, including its triangular base 1, about the center of the lug 2, and the length of the two yards marked on the staff is noted in the number of divisions occupied in the luminous scale $h$, projected onto the marked part of the staff. A mark is then made on the drawing-paper opposite to the corresponding division on the scale 3 marked on the side of the triangular base 1, and such mark gives the direction and distance of that point of the survey. In this way the operation of surveying is reduced to a very simple one and avoids any necessity for the translation of the value of the divisions. The instrument also has the further great advantage that it can be made very cheaply.

The instrument hereinbefore described with reference to Figs. 1 to $2^n$, inclusive, may also be provided, as shown in Fig. $2^n$, with a scale 3, as and for the purpose above described.

As will be evident, various other changes can be made in the details of construction of my geodetical instruments without departing from the spirit and scope of the invention so long as the relative arrangement of parts shown in the drawings or the mode of operation described in the specification is preserved.

The sighting device in each of the arrangements hereinbefore described may when desired be fitted with a monocle binocular or telescope, according to the class of instrument, in order to magnify the apparent size of the object and image, which, being practically at the same distance, can be seen distinctly with the same focusing of the telescope or equivalent. The accuracy of sighting does not, however, depend on the permanence of the position of the telescope, which may be held in the hand, if desired.

What I claim is—

1. In a geodetical instrument, the combination with the geodetical instrument proper, of a sight and means for rendering luminous rays proceeding therefrom parallel to one another and producing a virtual image of the sight that can be projected on the object being viewed and observed simultaneously therewith while the instrument is being used to make a measurement.

2. A geodetical instrument comprising a casing formed with an aperture therein and through which a distant object can be observed, a sight, means for rendering luminous rays proceeding from said sight parallel to one another and for reflecting them backward to the eye of an observer and producing a virtual image of said sight that can be seen simultaneously with a view of the distant object, a pivoted carrier bearing graduations arranged to come opposite the aperture in said casing, and reflecting means arranged to reflect an image of the graduations that are opposite said aperture backward to the eye of an observer simultaneously with an image of the sight.

3. A geodetical instrument comprising a sighting device consisting of a casing having an aperture therein and through which a distant object can be seen, a sight carried by said casing, and means for rendering luminous rays proceeding from said sight parallel to one another and producing a virtual image of the sight that can be seen simultaneously with the distant object, a box attached to said casing and formed with an aperture opposite the aperture in said casing, a carrier pivoted within said box and bearing a circular scale of degrees arranged to come opposite said apertures, and reflecting means arranged within said casing and adapted to produce an image of the portion of the scale opposite said apertures and enable said image to be seen while viewing the image of the sight and a distant object, substantially as described.

4. In a geodetical instrument, a sighting device comprising a sighting-tube having a piece of concavo-convex glass across its forward end and an inclined reflector at its rearward end, and a collimating-tube arranged at one side of said sighting-tube and provided with a sight, said piece of concavo-convex glass, inclined reflector and sight being arranged so that luminous rays proceeding from said sight will be reflected by said inclined reflector onto the concave side of the piece of concavo-convex glass from which they will be reflected as parallel rays, substantially as described.

5. A geodetical instrument comprising a casing through which a distant object can be viewed, a sight carried by said casing, means for rendering luminous rays proceeding from said sight parallel to one another and for reflecting them back to the eye of an observer and producing a virtual image of the sight that can be projected upon the distant object and viewed simultaneously therewith, a pivot at the under side of said casing, and ver ly movable needle-points located at the front and rear of said instrument, said pivot and needle-points being arranged in the same vertical plane as the virtual image of the sight, substantially as described for the purpose specified.

6. A geodetical instrument comprising a casing through which a distant object can be viewed, a sight carried by said casing, means for rendering luminous rays proceeding from said sight parallel to one another and for reflecting them back to the eye of an observer and producing a virtual image of the sight that can be projected upon the distant object and viewed simultaneously therewith, a level fixed to said casing, and reflecting means whereby an image of the air-bubble of said level can be viewed at the same time as the virtual image of said sight and the distant object.

7. A geodetical instrument comprising a casing through which a distant object can be viewed, a diaphragm carried by said casing and bearing a sight in the form of a scale, and means for rendering luminous rays proceeding from said sight parallel and for reflecting them backward to the eye of an observer while observing a distant object.

8. A geodetical instrument comprising a casing through which a distant object can be viewed and which is adapted to be turned about a vertical center, a diaphragm carried by said casing and bearing a sight in the form of a scale, and means for rendering luminous rays proceeding from said sight parallel and for reflecting them backward to the eye of an observer while observing a distant object.

9. A geodetical instrument comprising a casing through which a distant object can be viewed, a diaphragm carried by said casing and bearing a sight in the form of a calibrated scale, means for rendering luminous rays proceeding from said sight parallel and for reflecting them backward to the eye of an observer, a pivot at the under side of said casing, and vertically-movable needle-points located at the front and rear of said instrument, said pivot and needle-points being arranged in the same vertical plane as the virtual image of the sight, substantially as described for the purpose described.

10. A geodetical instrument comprising a casing through which a distant object can be viewed, a sight carried by said casing, means for rendering luminous rays proceeding from said sight parallel to one another and for reflecting them back to the eye of an observer and producing a virtual image of the sight that can be projected upon the distant object and viewed simultaneously therewith, a radial extension hinged or pivoted to the forward end of said casing and capable of being folded under the same, a pivot located at the under side of said casing and at the forward end thereof, a vertically-movable needle-point at the rear end of said casing, and a vertically-movable needle-point at the forward end of said radial extension, said pivot and needle-points being arranged in the same vertical plane as the virtual image of said sight.

11. A geodetical instrument comprising a casing through which a distant object can be viewed, a sight carried by said casing, means for rendering luminous rays proceeding from said sight parallel to one another and for reflecting them back to the eye of an observer and producing a virtual image of the sight that can be projected upon the distant object and viewed simultaneously therewith, a level secured to the under side of said casing, a radius-arm hinged or pivoted to said casing and capable of being folded under the same adjacent to said level, and a mirror secured to the under side of said radius-arm, substantially as described for the purpose specified.

12. In a geodetical instrument, a sighting device comprising a sighting-tube $a$ having a piece of concavo-convex glass at its front end and an inclined piece of parallel glass at its rear end, the concave side of said piece of concavo-convex glass being provided with a semitransparant reflecting-film, and said inclined piece of glass being provided with a reflecting-surface, and a collimating-tube $g$ extending from and inclined to one side of said sighting-tube and provided at its forward end with a diaphragm bearing a sight, substantially as described.

13. A geodetical instrument comprising a sighting-tube, a piece of glass extending across the same and provided with a semitransparent reflecting-surface arranged to reflect in a backward direction, luminous rays falling thereon, a collimating-tube arranged at one side of said sighting-tube, formed with an aperture through its wall and provided with a diaphragm bearing a sight, an inclined reflecting device located behind said aperture, and reflecting means adapted to reflect luminous rays proceeding from said inclined reflecting device and from said sight onto the reflecting-surface of the piece of glass extending across said sighting-tube, and an angle-measuring device comprising a box attached to said collimating-tube and formed with an aperture in its bottom arranged to coincide with that in said collimating-tube, and a carrier pivoted in said box and bearing a circular scale of degrees extending across said apertures, substantially as described for the purpose specified.

14. A geodetical instrument comprising a sighting-tube $a$ having at its forward end a piece of concavo-convex glass provided with a semitransparent reflecting-surface, and at its rearward end an inclined piece of parallel glass provided with a reflecting-surface, a collimating-tube $g$ extending from and inclined to one side of said sighting-tube and provided with an aperture $b$ in its top and a diaphragm at the forward end bearing a sight line or lines, an inwardly and backwardly inclined reflecting-surface $m$ located at the inner side of said aperture, a box $c$ attached to the combined sighting and collimating tubes and formed with an aperture in its bottom coinciding with said aperture $b$ in the collimating-tube, and a circular carrier $n$ pivoted within said box and bearing a circular scale $n'$ of degrees extending over said apertures, substantially as described for the purpose specified.

15. A geodetical instrument comprising a sighting-tube provided with a reflecting-surface adapted to reflect, in a backward direction, luminous rays falling upon it and through which a distant object can be seen, a collimating-tube carrying a diaphragm provided with a sight in the form of a scale, means for rendering luminous rays proceeding from said sight parallel to one another, and for directing them onto said reflecting-surface, and a base-piece on which said tubes are mounted, said base-piece being adapted to turn about a vertical center and being provided along one side with a scale of distances.

Signed at Rathminos, Dublin, this 3d day of September, 1901.

HOWARD GRUBB.

Witnesses:
EDMUND DOOLAN,
ROMNEY R. GRUBB.